May 15, 1951 D. F. STRANBERG Re. 23,365

SELF-SEALING RELEASABLE COUPLING

Original Filed Oct. 1, 1947

Inventor:

Don F. Stranberg.

By O. Young

Attorney

Reissued May 15, 1951 Re. 23,365

UNITED STATES PATENT OFFICE 23,365

SELF-SEALING RELEASABLE COUPLING

Don F. Stranberg, Libertyville, Ill., assignor to Charles L. Conroy, Waukegan, and Walter Fritsch, Libertyville, Ill.

Original No. 2,461,705, dated February 15, 1949, Serial No. 777,229, October 1, 1947. Application for reissue October 17, 1949, Serial No. 121,677

17 Claims. (Cl. 284—19)

Matter enclosed in heavy brackets [ ] appears in the original patent but forms no part of this reissue specification; matter printed in italics indicates the additions made by reissue.

The present invention relates to self-sealing releasable couplings for fluid pressure lines.

In conventional couplings of the foregoing type, two serious objections are encountered. One occurs in obtaining separation of the coupling at a predetermined pull-strain, due to variation in the line pressure, while the other results from difficulty in unseating the valves against the line pressure in order to connect the coupling members.

The present invention has for its object to overcome the foregoing objections by the provision of a comparatively simple and inexpensive releasable self-sealing coupling, which releases itself at a predetermined pull-strain, and which may be easily connected without the aid of tools, regardless of the amount of pressure within the line.

Incidental to the foregoing, a more specific object of the invention is to provide a coupling utilizing a predetermined proportion of the line pressure to oppose the seating force of said pressure on the valves, whereby the same may be unseated by manual force without the aid of tools, irrespective of the line pressure.

Another object of the invention is to provide a self-sealing releasable coupling with spring urged holding means affected by pressure force within the line substantially equal to the parting force of said pressure, whereby the coupling is released by sufficient pull-strain to overcome the spring tension, plus friction, on the holding means, irrespective of the amount cf pressure in the line.

In addition to the foregoing, other objects will appear as the description proceeds, and while the accompanying drawing illustrates one complete physical form of the invention constructed in accordance with the best mode so far devised, it is to be understood that changes in the precise embodiment of the invention are contemplated within the scope of the appended claims.

Figure 1:
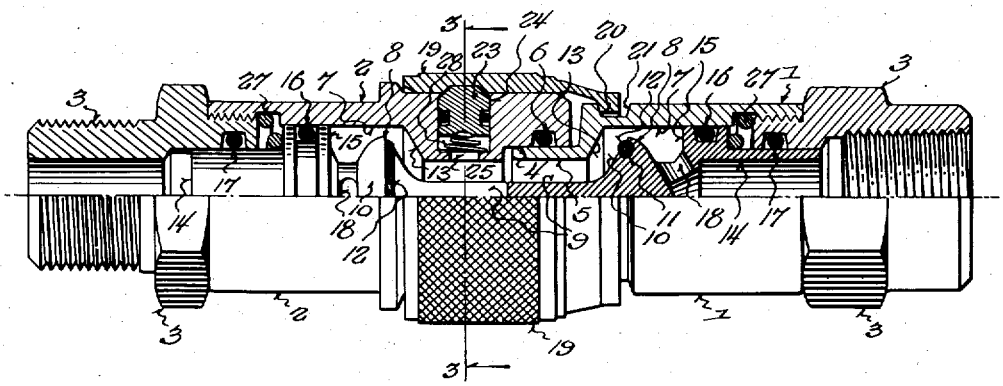
Fig. 1 is a half elevational and half sectional view of a coupling incorporating principles of the present invention, and illustrating the parts in connected relation.
Figure 2:
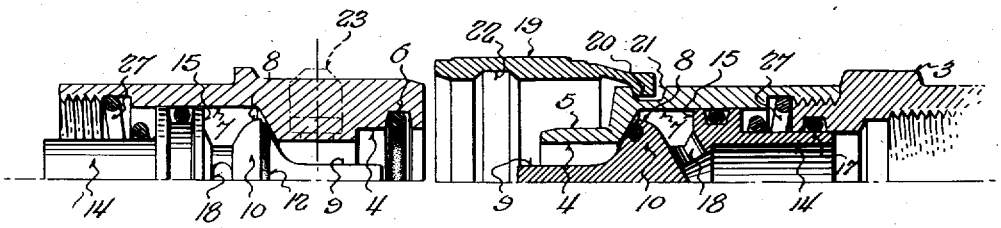
Fig. 2 is a fragmentary sectional view of the coupling when separated.

With particular reference to the drawing, the self-sealing releasable coupling illustrated comprises male and female coupling members 1 and 2, respectively, having axial fluid passage and provided with threaded end connectors 3 for attachment to conventional fittings of a fluid pressure hose or conduit (not shown).

The female coupling member 2 is provided at its forward end with a restricted cylindrical bore 4, for reception of a reduced cylindrical end 5 of the male coupling member 1, which is sealed within the bore of the female coupling member 2 by an O ring 6, or other equivalent packing.

Slidably mounted within enlarged bores 7, formed in both male and female coupling members 1 and 2, are self-sealing valves 8 of identical structure, and consequently a description of one valve will suffice for both.

Each valve 8 consists of a shank 9, which, in the unseated position of the valves shown in Fig. 1, abuts the shank of the valve in the adjacent coupling member. A valve head 10, carried by the shank 9, is provided on its seating face with a restricted annular groove 11 for confinement of a sealing ring 12 adaped to engage a tapered internal valve seat 13, formed between the enlarged bore 7 and the reduced end bore in each of the coupling members.

Extending axially from the valve head 10 is a cylindrical sleeve 14, slidably journaled within the connector 3 threaded into the end of the coupling member and sealed by an O ring 17. Intermediate its ends the sleeve 14 is provided with an external piston flange 15, which in turn is sealed within the enlarged bore 7 of the coupling member by an O ring 16. To afford communication between the interior and exterior of the sleeve 14, between the front face of the piston flange 15 and the valve head 10, the sleeve is provided with a plurality of radial openings 18.

For the purpose of releasably latching the separable coupling members 1 and 2 in the assembled relation shown in Fig. 1, a union sleeve 19, which snugly receives the female coupling member 2, is provided with an internal end flange 20 contracted into a periferial annular groove 21 formed on the male coupling member 1 to rotatably retain the sleeve 19 thereon. The inner face of the sleeve 19 is provided with an annular groove 22 for reception of a plurality of annularly spaced piston detents 23, slidably mounted in radial bores 24 formed in the female coupling member 2, and communicating with the axial passage of the member through openings 25. The piston detents are sealed within the radial bores 24 by packing rings 26, and urged outwardly to engage the annular groove 22 provided in the union sleeve 19 by helical coil springs 28.

A coil spring 27, surrounding the sleeve 14 and interposed between the rear face of the piston flange 15 and the inner end of the connector 3, exerts a slight tension on the piston flange, which serves to urge the valve 8 toward its seat 13, in the absence of pressure in the line, and to overcome friction to initiate closing action of the valve by pressure.

Operation

In operation, the present coupling is attached to the ends of two sections of fluid pressure hose or conduit of any type, by means of end connectors 3, which in turn are threaded, or secured in any suitable manner, in the ends of the separable male and female couplings 1 and 2 respectively.

As shown in Fig. 1, when the coupling members are joined in operative position, the reduced end 5 of the male coupling 1 extends into the end bore 4 of the female coupling 2, to provide a swivel and slidable connection securely sealed by the O ring 6.

In their connected positions the coupling members are latched against axial separation by the spring urged piston detents 23, carried by the coupling member 2 and normally projected into the internal annular groove 22 formed in the union swivel sleeve 19 secured on the male coupling 1.

Obviously, when the coupling members are joined, the abutted shanks 9 of the valves 8 serve to hold the valves off of their respective seats, permitting pressure fluid to flow through the coaxial passages in the coupling members. Inherently, the fluid pressure in the line exerts a parting force upon the coupling members, and under conditions of high pressure this force is increased proportionately.

However, in the present instance, the holding piston detents 23 are affected by line pressure because of the communicating openings 25 between the fluid passage in the coupling member 2 and the piston bores 24, thus increasing or reducing the holding force in fixed proportion to the parting force. While this proportion may be varied within a certain range, it is proposed to substantially equalize the pressure areas of the piston detents with those of the coupling member affected by the parting force. Consequently, only sufficient tensional or pull strain is required on the conduit or coupling members to depress the detents against the tension of the springs 28 and overcome friction in order to separate the coupling. The foregoing parting strain is accurately predetermined and constantly maintained through fixed tension of the springs 28, throughout variations in the line pressure.

In connection with the self-sealing function of the coupling, it will be apparent that upon parting of the coupling members, existing pressure in each section of the line will act upon the respective valves 8, forcing the same upon their seats 13 to seal the axial fluid passage in the coupling members.

As suggested in the preceding description of the structure illustrated, under conditions of low pressure, and the occurrence of friction between the valve journals and coupling members, the line pressure may be insufficient or slow in closing the valves, with resultant excessive fluid loss. This is overcome by the springs 27, which aid in effecting closing action of the valve.

Figure 4:
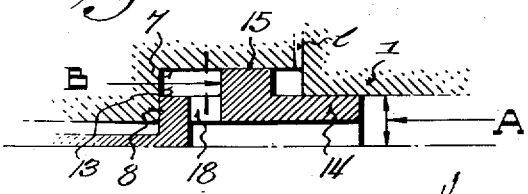
Fig. 4 is a diagrammatic sectional illustration of one of the valves and coupling members, for the purpose of explanation only.
Figure 3:
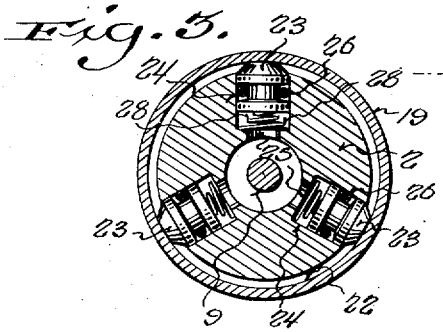
Fig. 3 is a transverse sectional view taken on the line 3—3 of Fig. 1.

To reduce the force required to unseat the valves 8 to a minimum, allow manual connection of the coupling members without the use of tools, the journal sleeves 14 carried by the valves 8 are provided with the piston flanges 15, the function of which might best be explained with reference to Fig. 4, which diagrammatically illustrates the principle of operation.

Here it will be noted that one face of the piston flange 15 is affected by the line pressure passing through the radial openings 18 in the sleeve 14. Obviously, pressure against the rear surface of the valve head and valve sleeve within the area A, tends to force the valve upon its seat, while pressure within the area B affecting the flange 15, opposes the closing force. Therefore, the area of the affected surfaces of the flange 15 is less than the affected valve surfaces in the area A, as a result of which the proportionate differential between the two forces functions to hold the valve upon its seat.

The above differential seating force is predetermined to the extent that it permits manual unseating of the valve under a maximum pressure capacity in the line, whereby the coupling members may be readily connected by forcing the two together by hand, without the aid of a wrench, vise, pry-bar, or special tool, such, as required in conventional releasable couplings. The bleed opening "1" shown in Fig. 4, merely serves to prevent a pressure lock behind the piston flange 15, and represents the equivalent of leakage occurring through the threads in the connection between the coupling members and connectors 3.

From the foregoing explanation, considered in connection with the accompanying drawing, it will be apparent that a comparatively simple, compact and highly effective self-sealing releasable and swivel coupling has been devised, which is separable upon an accurately predetermined tensional or pull-strain, and which may be easily connected by hand against the maximum pressure capacity of the conduits.

While the invention has been described in considerable detail as applied to the coupling, released upon tensional strain, that feature relating to reduction of force required for unseating the sealing valve is applicable to couplings connected by a union nut, inasmuch as it permits the nut to be threaded on the coupling by hand, instead of requiring a wrench or tool.

*Although the novel feature of the present invention pertaining to the self-sealing valves has been illustrated and described in considerable detail, as applied to both coupling members (1 and 2) for most efficiently connecting the coupling members under usual conditions, it will be obvious that a self sealing valve of the present type may be advantageously employed in only one of the coupling members, by providing a manually controlled pressure cut-off in the opposite end of the line.*

*For example, when a releasable coupling is installed in a line between a tractor equipped to create fluid pressure, and a drawn implement affected by the pressure fluid, the tractor may be provided with a manually controlled pressure fluid cut-off, actuated by the operator upon release of the coupling. Under such condition pressure would be relieved in the tractor line but retained in the implement line. Therefore, a valve of the present type included in the implement end of the coupling only, would be sufficient to allow manual connection of the coupling with-*

*out the aid of tools in the manner explained above.*

Furthermore, the principle of the present latching or holding mechanism may be used in releasable couplings for fluid pressure lines in which there is no provision for sealing the coupling members upon disconnection, such as in air-brake conduits in which the line pressure must be released upon separation of the couplings.

Although specific proportional pressure has been mentioned throughout the specifications for the purpose of illustration, it is to be understood that these may be varied within certain ranges without departing from the principles of the invention, it being merely necessary that the pressures function to accomplish the purposes and advantages set forth.

I claim:

1. A self-sealing releasable coupling for fluid pressure lines comprising, a pair of separable coupling members, means for releasably holding said members in coupled relation, a pressure seated valve carried by each of said coupling members for sealing said members when separated, means for unseating said valves upon connection of said coupling members, and means associated with each of said valves [and affected by a predetermined proportionate force of the line pressure to oppose the seating force of said pressure, the force of said opposing pressure being less than said seating pressure to allow unseating of the valve by manual force without the aid of tools.] *on the pressure side of the valve seats for determining the seating force exerted upon said valves by the line pressure, said means being affected by atmospheric pressure opposed by a proportionate force of the line pressure tending to unseat said valves, the unseating force being less than the seating force.*

[2. A self-sealing releasable coupling for fluid pressure lines comprising, a pair of separable coupling members, means for releasably holding said members in coupled relation, a pressure seated valve carried by each of said coupling members for sealing said members when separated, means for unseating said valves upon connection of said coupling members, and means associated with each of said valves providing opposed surfaces of different area affected by the line pressure to establish a differential force urging the valve upon its seat.]

3. A self-sealing releasable coupling for fluid pressure lines comprising, a pair of seperable coupling members, means for releasably holding said members in coupled relation, a pressure seated valve carried by each of said coupling members for sealing said members when separated, means for unseating said valves upon connection of said coupling members, and [pistons] *a piston* associated with each of said valves [and affected by a proportionate force of the line pressure to oppose the closing force of said pressure upon said valve, said opposing force being less than said seating force.] *on the pressure side of the valve seats for determining the seating force exerted upon said valves by the line pressure, said pistons being affected by atmospheric pressure on one side and opposed by a proportionate force of the line pressure tending to unseat said valves, the unseating force being less than the seating force.*

4. A self-sealing releasable coupling for fluid pressure lines comprising, a pair of separable coupling members having co-axial fluid passage, means for releasably holding said members in coupled relation, a pressure seated valve slidably mounted in the fluid passage of each of said coupling members for sealing said members when separated, said valves having abutted engagement for holding them off of their respective seats, a cylindrical sleeve carried by each of said valves, and an annular piston flange provided on said sleeve and operable within the fluid passageway of said coupling member, said piston flange being affected by a proportionate force of the line pressure to oppose the closing force of said pressure upon said valve, said opposing force being less than said closing force.

5. A releasable coupling for fluid pressure lines comprising, a pair of separable coupling members upon which the line pressure exerts a parting force, means actuated by line pressure for holding said coupling members in connected relation with a force opposed to and substantially equal to said parting force, and spring tension means augmenting said pressure holding force in urging said holding means into operative position.

6. A releasable coupling for fluid pressure lines comprising, a pair of separable coupling members upon which the line pressure exerts a parting force, a fluid pressure piston in communication with the line pressure for holding said coupling members in connected relation with a force opposed to and substantially equal to said parting force, and a spring augmenting the pressure force on said piston to urge the piston into operative holding position.

7. A self-sealing releasable coupling for fluid pressure lines comprising, a pair of separable coupling members upon which the line pressure exerts a parting force, means actuated by the line pressure for holding said coupling members in connected relation with a force opposed to and substantially equal to said parting force, spring tension means augmenting said pressure holding force in urging said holding means into operative position, a pressure seated valve carried by each of said coupling members for sealing said members when separated, means for unseating said valves upon connection of said coupling members, and means associated with each of said valves and affected by a predetermined proportionate force of the line pressure to oppose the seating force of said pressure, the force of said opposing pressure being less than said seating pressure to allow unseating of the valves by manual force without the aid of tools.

8. A self-sealing releasable coupling for fluid pressure lines comprising, a pair of separable coupling members upon which the line pressure exerts a parting force, a fluid pressure piston in communication with the line pressure force for holding said coupling members in connected relation with a force opposed to and substantially equal to said parting force, a spring augmenting the pressure force on said piston to urge the piston into operative holding position, a pressure seated valve carried by each of said coupling members for sealing said members when separated, means for unseating said valves upon connection of said pressure members, and means associated with each of said valves providing opposed surfaces of different area affected by the line pressure to establish a differential force urging the valve upon its seat.

9. A self-sealing releasable coupling for fluid pressure lines comprising, a pair of separable coupling members upon which the line pressure exerts a parting force, means actuated by the line pressure for holding said coupling members in connected relation with a force opposed to and substantially equal to said parting force, spring tension means augmenting said pressure holding means for urging said holding means into operative position, a pressure seated valve carried by each of said coupling members for sealing said members when separated, means for unseating said valves upon connection of said coupling members, and means associated with each of said valves providing opposed surfaces of different area affected by the line pressure to establish a differential force urging the valve upon its seat.

10. A self-sealing releasable coupling for fluid pressure lines comprising, a pair of separable coupling members upon which the line pressure exerts a parting force, a fluid pressure piston in communication with the line pressure for holding said coupling members in connected relation with a force opposed to and substantially equal to said parting force, a spring augmenting the pressure force of said piston to urge the piston into operative holding position, a pressure seated valve carried by each of said coupling members for sealing said members when separated, means for unseating said valves upon connection of said coupling members, and means associated with each of said valves providing opposed surfaces of different area affected by the line pressure to establish a differential force urging the valve upon its seat.

11. A self-sealing releasable coupling for fluid pressure lines comprising, a pair of separable coupling members upon which the line pressure exerts a parting force, means actuated by the line pressure for holding said coupling members in connected relation with a force opposed to and substantially equal to said parting force, spring tension means augmenting said pressure holding force in urging said holding means into operative position, a pressure seated valve carried by each of said coupling members for sealing said members when separated, means for unseating said coupling members, and pistons associated with each of said valves and affected by a proportionate force of the line pressure to oppose the closing force of said pressure upon said valve, said opposing force being less than said seating force.

12. A self-sealing releasable coupling for fluid pressure lines comprising, a pair of separable coupling members upon which the line pressure exerts a parting force, a fluid pressure piston in communication with the line pressure for holding said coupling members in connected relation with a force opposed to and substantially equal to said parting force, a spring augmenting the pressure on said piston to urge the piston into operative holding position, a pressure seated valve carried by each of said coupling members for sealing said members when separated, means for unseating said valves upon connection of said coupling members, and pistons associated with each of said valves and affected by a proportionate force of the line pressure to oppose the closing force of said pressure upon said valves, said opposing force being less than said seating force.

13. A self-sealing releasable coupling for fluid pressure lines comprising, a pair of separable coupling members upon which the line pressure exerts a parting force, said coupling members having coaxial fluid passages, means actuated by the line pressure for holding said coupling members in connected relation with a force opposed to and substantially equal to said parting force, spring tension means augmenting said pressure holding force in urging said holding means into operative position, a pressure seated valve slidably mounted in the fluid passage of each of said coupling members for sealing said members when separated, said valves having abutted engagements for holding them off of their respective seats when the coupling members are joined, a cylindrical sleeve carried by each of said valves and an annular piston flange provided on said sleeve and operable within the said fluid passageway of said coupling member, said piston flange being affected by a proportionate force of the line pressure to oppose the closing force of said pressure upon said valve, said opposing force being less than said closing force.

14. A self-sealing releasable coupling for fluid pressure lines comprising, a pair of separable coupling members upon which the line pressure exerts a parting force, said coupling members having co-axial fluid passages, a fluid pressure piston in communication with the line pressure for holding said coupling members in connected relation with a force opposed to and substantially equal to said parting force, a spring augmenting the pressure force on said piston to urge the same into operative holding position, a pressure seated valve slidably mounted in the fluid passage of each of said coupling members for sealing said passages when said couplings are separated, said valves having abutted engagements for holding them off of their respective seats when said coupling members are joined, a cylindrical sleeve carried by each of said valves, and an annular piston flange provided on said sleeve and operable within the fluid passage of said coupling member, said piston flange being affected by a proportionate force of the line pressure to oppose the closing force of said pressure upon said valve, said opposing force being less than said closing force.

*15. A self-sealing releasable coupling for fluid pressure lines comprising, a pair of separable coupling members, means for releasably holding said members in coupled relation, a pressure seated valve carried by one of said coupling members for sealing said member when separated, means for unseating said valve upon connection of said coupling members, and means associated with said valve on the pressure side of the valve seat for determining the seating force exerted upon said valve by the line pressure, said means being affected by atmospheric pressure opposed by a proportionate force of the line pressure tending to unseat said valve, the unseating force being less than the seating force.*

*16. A self-sealing releasable coupling for fluid pressure lines comprising, a pair of separable members in coupled relation, a pressure seated valve carried by one of said coupling members for sealing said member when separated, means for unseating said valve upon connection of said coupling members, and a piston associated with said valve and affected by a proportionate force of the line pressure to oppose the closing force of said pressure upon said valve, said opposing force being less than said seating force.*

*17. A self-sealing releasable coupling for fluid pressure lines comprising, a pair of separable coupling members having co-axial fluid passages, means for releasably holding said members in coupled relation, a pressure seated valve slidably mounted in the fluid passage one of said coupling members for sealing said member when sep-*

*arated, said valve having abutted engagement for holding it off of its respective seat, a cylindrical sleeve carried by said valve, and an annular piston flange provided on said sleeve and operable within the fluid passageway of said coupling member, said piston flange being affected by a proportionate force of the line pressure to oppose the closing force of said pressure upon said valve, said opposing force being less than said closing force.*

*18. A self-sealing releasable coupling for fluid pressure lines comprising, a pair of separable coupling members upon which the line pressure exerts a parting force, means actuated by the line pressure for holding said coupling members in connected relation with a force opposed to and substantially equal to said parting force, spring tension means augmenting said pressure holding force in urging said holding means into operative position, a pressure seated valve carried by one of said coupling members for sealing said member when separated, means for unseating said valve upon connection of said coupling members, and means associated with said valve and affected by a predetermined proportionate*

*force of the line pressure to oppose the seating force of said pressure, the force of said opposing pressure being less than said seating pressure to allow unseating of said valve by manual force without the aid of tools.*

DON F. STRANBERG.

REFERENCES CITED

The following references are of record in the file of this patent or the original patent:

UNITED STATES PATENTS

| Number | Name | Date |
|---|---|---|
| 162,169 | Hopkins | Apr. 20, 1875 |
| 324,031 | Lacey | Aug. 11, 1885 |
| 442,621 | Harris et al. | Dec. 16, 1890 |
| 486,001 | Tinsley | Nov. 8, 1892 |
| 592,461 | Westinghouse et al. | Oct. 26, 1897 |
| 968,532 | Brenica | Aug. 30, 1910 |
| 1,255,756 | Jones | Feb. 5, 1918 |
| 1,808,990 | Langdon | June 9, 1931 |
| 2 135,221 | Scheiwer | Nov. 1, 1938 |
| 2,296,170 | Lockhart | Sept. 15, 1942 |
| 2,299,193 | Trautman | Oct. 20, 1942 |
| 2,461,940 | Sundstrom | Feb. 15, 1949 |